US011765310B2

(12) United States Patent
Rogers et al.

(10) Patent No.: US 11,765,310 B2
(45) Date of Patent: *Sep. 19, 2023

(54) TELEVISION VIDEO AND/OR AUDIO OVERLAY ENTERTAINMENT DEVICE AND METHOD

(71) Applicants: Craig Randall Rogers, Tualatin, OR (US); Brayton Cameron Rogers, Tualatin, OR (US)

(72) Inventors: Craig Randall Rogers, Tualatin, OR (US); Brayton Cameron Rogers, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/369,294

(22) Filed: Jul. 7, 2021

(65) Prior Publication Data
US 2021/0337139 A1    Oct. 28, 2021

Related U.S. Application Data

(63) Continuation of application No. 16/398,788, filed on Apr. 30, 2019, now Pat. No. 11,089,240.
(Continued)

(51) Int. Cl.
*H04N 5/272* (2006.01)
*H04N 5/445* (2011.01)
(Continued)

(52) U.S. Cl.
CPC ............ *H04N 5/272* (2013.01); *G06F 16/51* (2019.01); *G06F 16/54* (2019.01); *G06F 16/71* (2019.01);
(Continued)

(58) Field of Classification Search
CPC ............... H04N 5/272; H04N 5/44504; H04N 21/42204; H04N 21/47; H04N 21/42208;
(Continued)

(56) References Cited

U.S. PATENT DOCUMENTS 5,343,239 A * 8/1994 Lappington .......... H04N 21/235
348/478
7,053,915 B1 * 5/2006 Jung ...................... G10H 1/368
345/629
(Continued)

FOREIGN PATENT DOCUMENTS

GB        2206758 A  *  1/1989 ............. H03K 17/62

*Primary Examiner* — Michael Lee
(74) *Attorney, Agent, or Firm* — Craig R. Rogers; SIMPLE IP Law, P.C.

(57) ABSTRACT

An entertainment device provides multiple users with the ability to simultaneously select and place various still or video images or animations over a video transmission provided to a television from a cable box, antenna, video streaming device, or other video supply device for personal entertainment purposes. The image overlay can be provided in real-time or substantially in real-time, such as with minimal delay. The entertainment device may further provide the ability to overlay audio onto, or replace entirely, the audio signal supplied with the video signal. The entertainment device may be provided, for instance, as a stand-alone unit, or may be integrated into a cable box or other video supply device (i.e., dvd player, blu-ray player, cell phone, tablet, computer, streaming device, etc.).

20 Claims, 5 Drawing Sheets

Related U.S. Application Data (60) Provisional application No. 62/667,957, filed on May 7, 2018.

(51) Int. Cl.
  *G06F 16/51* (2019.01)
  *G06F 16/54* (2019.01)
  *G06F 16/71* (2019.01)
  *H04N 21/47* (2011.01)
  *H04N 21/422* (2011.01)

(52) U.S. Cl.
  CPC ... *H04N 5/44504* (2013.01); *H04N 21/42204* (2013.01); *H04N 21/47* (2013.01); *H04N 21/4222* (2013.01); *H04N 21/42208* (2013.01); *H04N 21/42224* (2013.01)

(58) Field of Classification Search
  CPC ......... H04N 21/4222; H04N 21/42224; H04N 21/4318; H04N 21/47205; G06F 16/51; G06F 16/54; G06F 16/71
  See application file for complete search history.

(56) References Cited

U.S. PATENT DOCUMENTS

| | | | |
|---|---|---|---|
| 11,089,240 B2* | 8/2021 | Rogers | H04N 5/272 |
| 2005/0119053 A1* | 6/2005 | Suzuki | A63F 13/92 |
| | | | 463/42 |
| 2007/0288969 A1* | 12/2007 | Prum | A63F 13/235 |
| | | | 725/135 |
| 2011/0246908 A1* | 10/2011 | Akram | H04N 21/4788 |
| | | | 715/752 |
| 2014/0228118 A1* | 8/2014 | Hardy | A63F 13/655 |
| | | | 463/31 |
| 2015/0135049 A1* | 5/2015 | Murphy | H04N 21/47205 |
| | | | 715/205 |
| 2015/0312617 A1* | 10/2015 | Chen | G06F 3/03547 |
| | | | 348/734 |
| 2016/0191958 A1* | 6/2016 | Nauseef | G06V 40/20 |
| | | | 725/116 |
| 2016/0350953 A1* | 12/2016 | Mittelstaedt | H04L 51/043 |
| 2018/0167692 A1* | 6/2018 | Kedenburg, III | H04N 21/482 |
| 2019/0208279 A1* | 7/2019 | Anker | H04N 21/482 |
| 2020/0252691 A1* | 8/2020 | Lyons | H04N 21/4788 |
| 2022/0060368 A1* | 2/2022 | Caspi | H04N 21/43615 |

\* cited by examiner

TELEVISION VIDEO AND/OR AUDIO OVERLAY ENTERTAINMENT DEVICE AND METHOD

PRIORITY CLAIM

Priority Information

This application is a continuation of and claims priority from U.S. patent application Ser. No. 16/398,788, filed Apr. 30, 2019 (now Issued U.S. Pat. No. 11,089,240), which is a non-provisional of, and claims priority from, U.S. Provisional Patent Application Ser. No. 62/667,957, filed May 7, 2018, the contents of each of which are incorporated herein by reference in their entirety.

BACKGROUND OF THE INVENTION

Field of the Invention

This invention relates generally to video and audio signals provided to a television set, preferably in real-time.

Related Art

Televisions typically receive a real-time video and audio signal directly from an antenna, cable box, or other audio/video source. The audio and video signals, however, may occasionally be passed through another device such as a receiver, splitter, or switch. Generally, audio/video pass-through devices are intended to preserve or enhance the original signals but not modify them substantively. What is desired is an audio/video pass-through device and method that enables a user to add images and sounds to the real-time audio/video signal for entertainment purposes.

SUMMARY OF THE INVENTION

According to various embodiments and principles of the present inventive concepts, an entertainment device (such as a set-top entertainment device or pass-through entertainment device) provides a user with the ability to select and place various video images over a video image provided to a television from a cable box, antenna, video streaming device, or other video supply device or external signal source for personal entertainment purposes. The image overlay can be provided in real-time. The entertainment device may further provide the ability to overlay audio onto, or replace entirely, the audio signal supplied with the video signal. The entertainment device may be provided, for instance, as a stand-alone unit, or may be integrated into the cable box or other video supply device (i.e., dvd player, bluray player, Apple TV or other video streaming device, etc.).

The entertainment device may include, for instance, one or more of the following: a power supply, an audio and/or video input port, an image processor, a control circuit, a CPU, a storage device, a wifi connection device, a network connection port, a Bluetooth or other wireless communications link, an IR receiver, a USB input/output port, an input panel, and an audio and/or video output port. A connected or separate controller such as a wireless remote, wireless controller, Bluetooth controller, or USB or other wired controller may also be provided to connect with and control the entertainment device. Alternatively or additionally, a Bluetooth device such as a cell phone, tablet, or other Bluetooth device may be used to control the set top entertainment device through the use of an application or other software. A camera, microphone, and/or other audio and/or video input device could also be connected to the entertainment device either through the USB port, the Bluetooth communications link, the network connector, or other wired or wireless connection.

The storage device may include a hard drive, memory card reader, and/or other data storage device capable of storing one or more image and/or audio databases to be accessed by the entertainment device. The image database may, for example, be a database comprising clip art images, animations, or short video clips. The audio database could be, for instance, a database including various sound effects. The databases should be accessible by the user of the entertainment device to permit the user to select images, sounds, or video segments from the database using the controller.

In some embodiments, images, animations, or video segments in the database could be linked to specific sounds such that selection of those images automatically selects the associated sound. For instance, gas clouds could be associated with the sound of passing gas, or explosion video effects could be associated with a corresponding explosion sound, such that selecting those images, animations, or video effects automatically includes the associated sound in the audio output.

The entertainment device may be connected between an audio/video input signal and a television (such as between a cable box and a television), or, alternatively, may be integrated into the audio/video supply device (such as a cable box, dvd player, dvr, video streaming device, etc.). The entertainment device preferably passes the input audio/video signal through to the television but permits the user to overlay selected images, animations, or video clips on top of the video images being passed through to create a humorous or entertaining video output that can be supplied to and displayed on the television. Sounds or sound effects can also (or alternatively) be incorporated into or replace the audio in the audio signal to enhance the entertainment experience.

For example, the database could comprise a set of images containing humorous facial features such as noses, mustaches, horns, antlers, ears, mouths, etc. The user could use the controller to select one or more images from the database to display on selected locations of the screen or over selected portions of the underlying image. Alternatively, or additionally, software (such as image recognition software) could be included in the entertainment device to permit the user to attach the image to a certain feature in the underlying video image so that the attached image will move and/or rotate with the selected feature in the underlying image.

Alternatively or additionally, the database could comprise a set of images, animations, and/or video segments or effects and associated or linked sound effects. For instance, an image, animation, or video segment of a cloud of gas could be included and could further be associated with (or linked to) the sound of passing gas. An image, animation, or video segment of an explosion could be included and could further be associated with (or linked to) a corresponding sound of an explosion. A separate sound effect database could also be provided permitting users to select sounds to overlay the audio track with or without an associated image, animation, or video segment. Users could also be permitted to create their own links between video and audio content in the database(s). When an image, animation, or video segment is selected having a linked sound, the sound can be automatically outputted with the audio output as the image is displayed.

The images can be set to display for a predetermined length of time, and/or the user can be permitted to select and/or adjust his own preferences for how long to display an image. Animations, video segments, and audio effects can also be configured to generally play for their default length of time, but could also be permitted to repeat, slow-motion play, or speed up to fit a desired user-selected time period.

Of course, numberless possibilities exist for the selection of sounds, images, animations, and video segments to be included in the databases. Certain databases may be preinstalled in the storage device, and other databases may be later accessed and installed through the USB port, the Bluetooth communications link, the wifi connection, and/or the network port. Various libraries of databases can be made available for access online through the device itself, through a connectable Bluetooth device, or through a separate device that can retrieve and store the database on a removable or other media that can permit later transfer to the entertainment device.

These libraries may include, for instance, free libraries, paid libraries and community libraries. More specifically, certain databases may be made available for free or for purchase online or may be preinstalled and made unlockable based on certain conditions, such as purchasing or otherwise enrolling in a subscription service. In addition, users could be provided with the ability to create their own databases of sounds, images or video segments using an audio and/or video input device, controller, and/or other sound or image creation devices. A forum or community could be formed to make user-created databases accessible by other users. An application could be provided for a user's handheld electronic device (such as a tablet or cellphone) that permits the creation of database content (such as images, videos, and/or sounds).

In one embodiment, the entertainment device in connection with a video input device could be usable to overlay live video or pre-recorded video segments over the underlying video signal in real-time. A green-screening feature could be implemented to select which areas of the selected video segment to eliminate from the video overlay. The green-screening selection capability could be provided in the device itself or through an associated program or application software (i.e., a Bluetooth device app) to permit a user to select a color from the selected video segment to eliminate from the video overlay. Audio from an input device could also be received and used to overlay or entirely replace the audio from the incoming audio/video signal.

A capture feature could further be provided to permit a user to capture images or short video clips of the combined video output signal (with or without audio) for later viewing or sharing. The combined output images, video output segments, or audio/video output segments could then be shared, for example, via social media or via an online user community.

In one embodiment, the Bluetooth communications link permits one or more users to connect to and control the set top entertainment device using their own handheld electronic devices (such as cellphones, tablets, or other Bluetooth devices). An app may be provided to be installed on the handheld device to provide it with the desired functionality. While watching a television or other video program supplied to the television from an audio/video source through the entertainment device, the one or more users can each use their individual controllers to select and add sounds, images, animations, and/or video segments from the desired databases over the underlying audio and video signals to create humorous audio and/or visual effects to be enjoyed by themselves, the other users, and anyone else viewing the television, preferably in real-time. The users could also be provided with the ability to capture images or short audio/video segments from the audio/video output signal to view later or share.

In an alternative embodiment, a user may use the green-screening feature in connection with a video input device to add video of themselves or other desired video images over the underlying video signal. For instance, a user may create a video segment and select a color to remove from the image overlay. The entertainment device could then overlay the video segment on top of the underlying image with areas of the created video segment of the selected color being removed from the image overlay.

Various further aspects, embodiments, and configurations of this invention are possible without departing from the principles disclosed herein. This invention is therefore not limited to any of the particular aspects, embodiments, or configurations described herein. And further variations and configurations will be readily understood based on the accompanying drawings and further detailed description of illustrative embodiments.

BRIEF DESCRIPTION OF DRAWINGS

The foregoing and additional objects, features, and advantages of the present inventive concepts will become more readily apparent from the following detailed description of illustrative embodiments made with reference to the accompanying drawings, in which.

DETAILED DESCRIPTION OF ILLUSTRATIVE EMBODIMENTS

Various features, benefits, and configurations incorporating the principles of the present inventive concepts in illustrative embodiments are shown and described in greater detail in the accompanying drawings. Additional features, benefits and configurations will be readily apparent to those of ordinary skill in the art based on this disclosure, and all such features, benefits and configurations are considered within the scope of the present invention. Various illustrative embodiments will now be described in connection with the accompanying drawings.

According to various embodiments and principles of the present inventive concepts, an entertainment device, such as a set-top or pass-through entertainment device, provides a user with the ability to select and place various video images over a video image provided to a television from a cable box, antenna, video streaming device, or other video source or supply device for personal entertainment purposes. The image overlay can, for instance, be provided in real-time. The entertainment device may further provide the ability to overlay audio onto, or replace entirely, the audio signal supplied with the video signal.

Figure 1:
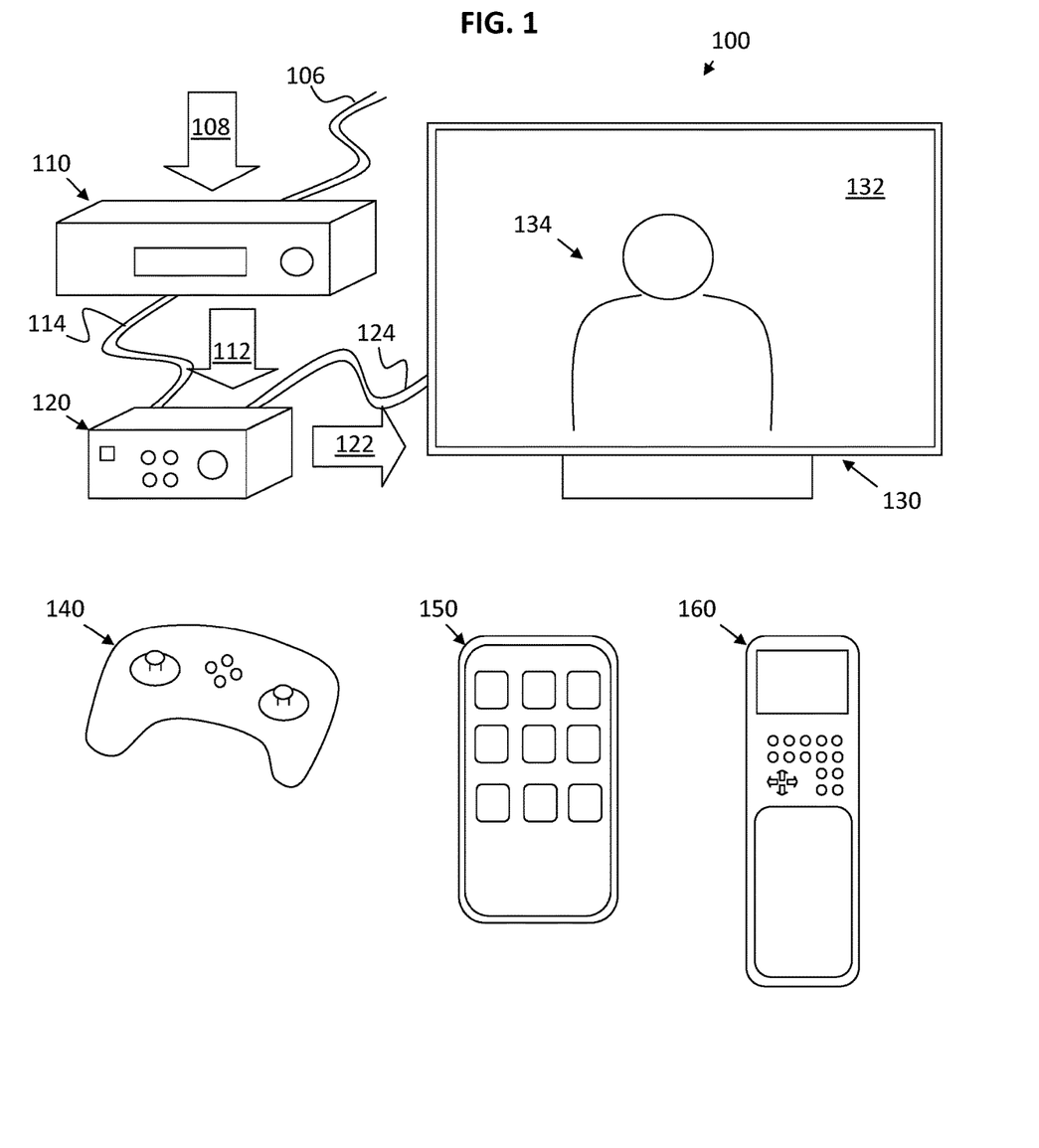
FIG. 1 is a schematic illustration of a system for providing entertainment, including an audio/video source device, an entertainment device, a television or other display, and various possible control devices according to principles of the present inventive concepts.

Referring first to FIG. 1, a system 100 for providing entertainment may include an audio/video source device (such as a cable box, dvr, dvd player, Apple TV or other streaming media device, or other source of audio/video content) 110, an entertainment device 120, and a television 130. The audio/video source device 110 may receive an external audio/visual signal 108 through a source cable 106, airwaves, a wifi or network connection, etc., or it may generate the audio/video signal internally. The audio/video source device 110 provides an audio/visual output signal 112 to the entertainment device 120. The audio/video source device 110 and the entertainment device 120 may be connected together through an HDMI cable 114 or other wired or wireless connection. And the television (or other video display device) 130 may be connected to the entertainment device 120 through an HDMI cable 124 or other wired or wireless connection.

In an alternative embodiment, the entertainment device 120 may be included integrally as part of the audio/video source device 110. In such an embodiment, an external connection between the source device 110 and the entertainment device 120 would be unnecessary.

The entertainment device 120 outputs a signal 122 to the television 130. When the entertainment device 120 is idle or inactive, the signal 122 could be a pass-through audio/video signal which replicates the signal 112 received from the source device 110.

One or more control devices 140, 150, 160 could be provided to control the entertainment device 120. The control devices could, for example, include a wired or wireless controller 140, a handheld electronic device such as a cellphone or tablet 150 (preferably with Bluetooth or comparable connectivity), or a remote control 160 that communicates through any desired wireless protocol (e.g., IR, Bluetooth, etc.).

Figure 2:
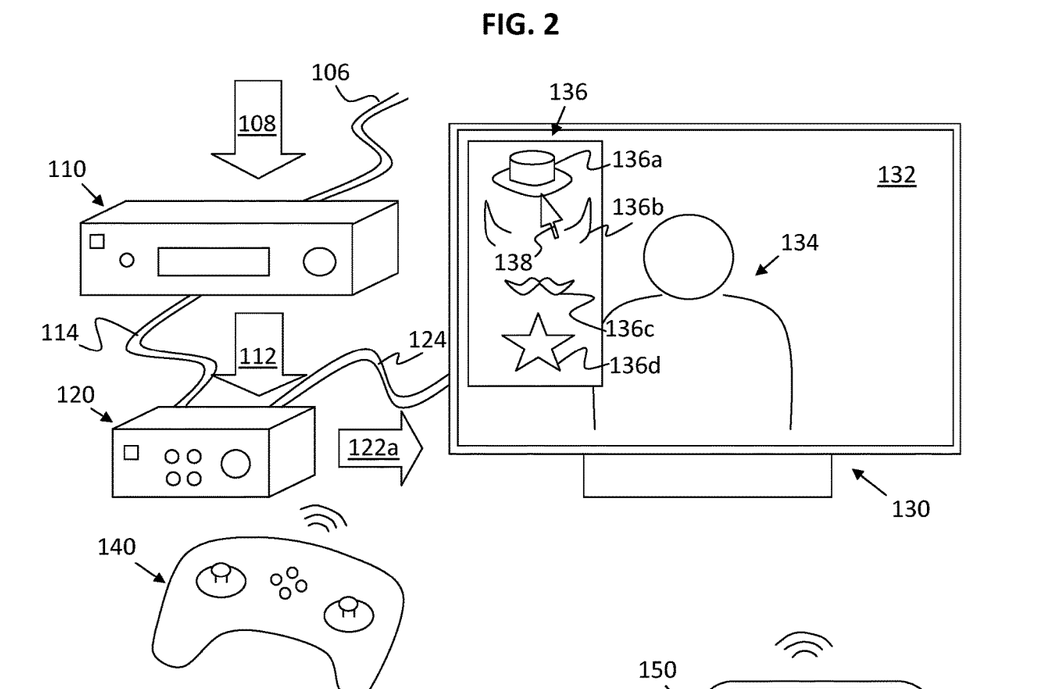
FIG. 2 is a schematic illustration of the entertainment system of FIG. 1, illustrating a selection process for selecting video content to add to an underlying video image, such as in real-time.
Figure 3:
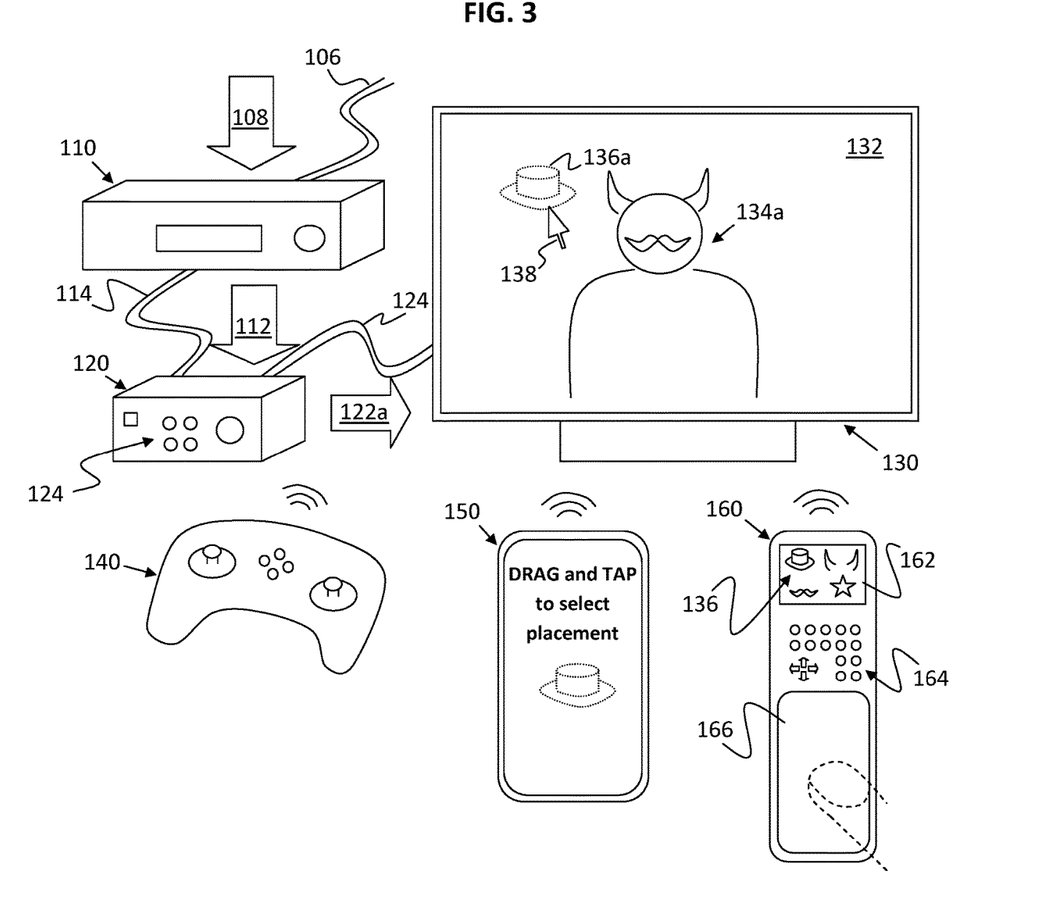
FIG. 3 is a schematic illustration of the entertainment system of FIG. 1, illustrating a process of placing video overlay images onto an underlying video transmission according to further principles of the present inventive concepts.

Referring now to FIGS. 2 through 3, the entertainment device 120 may be used to provide a humorous surface image on top of the underlying source image in the modified signal 122a transmitted to the television 130. Specifically, a user may use the control device 140 (or 150 or 160) to select a desired image 136a from an image database 410a (see FIG. 5) to apply to the underlying image 134. In one embodiment, a pop-up window 136 could be displayed on the screen 132 with a variety of images 136a, 136b, 136c, 136d from an image database 410a for a user to choose from. The user could select a desired image 136a from the available selections and then choose a location on the screen 132 to place the image 136a. A selection tool 138, such as an arrow or other cursor, could be provided, or the image selections could be highlighted or otherwise identified during the selection process. A composite image 134a containing the underlying image 134 and the overlay image(s) 136a is provided by the entertainment device 120 as a combined output signal 122a to be displayed on the screen 132.

Figure 2A:
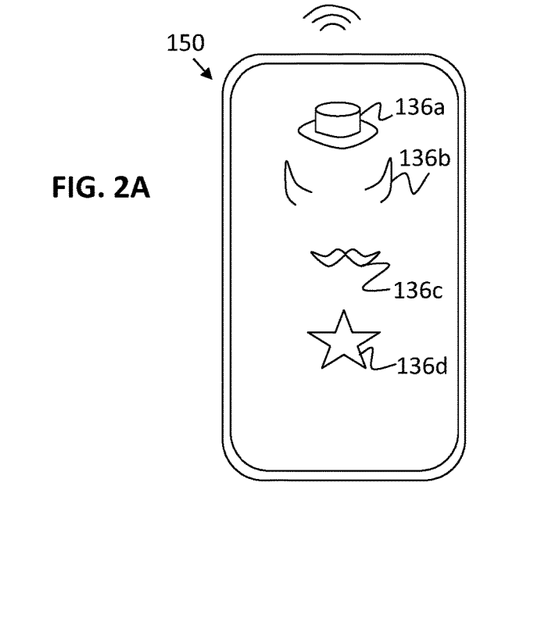
FIG. 2A is a schematic illustration of a Bluetooth control device, such as a cellphone or other handheld electronic device, usable to control the entertainment device.

The control device could be a wired or wireless controller 140, for instance, or it could be a Bluetooth-connected device such as a phone or tablet 150. Alternatively, the control device could be a specially constructed wireless remote 160. Referring specifically to FIG. 2A, in the case of a handheld electronic device such as a cellphone, the cellphone could include an application that is specially configured to control the entertainment device 120. The app could provide a selection of images 136a, 136b, 136c, 136d from an image database for the user to choose from. Once selected, the user could then be permitted to select a location on the screen 132 for the image to appear.

A specially configured remote control 160 could also, or alternatively, be provided. The specially configured remote control could include a display 162 that includes images or icons of images 136 from a database for a user to choose from. The display 162 could be a touch display that allows selection by touching the display 162 directly. Alternatively, selection could be made using buttons 164 provided on the remote, or using a touch pad 166. The touch pad 166 may be provided to permit a user to control the entertainment device 120, for example to select a position on the screen 132 for the image to appear by swiping a finger across the touch pad to move the selected image 136a into the desired position.

Control buttons, dials, touch pads, or other input devices 124 could also be provided on the entertainment device 120 to permit a user to control the entertainment device 120 using the input devices on the entertainment device 120 itself. Of course, other control devices are also within the level of ordinary skill in the art and will be readily apparent based on the present disclosure.

Figure 4:
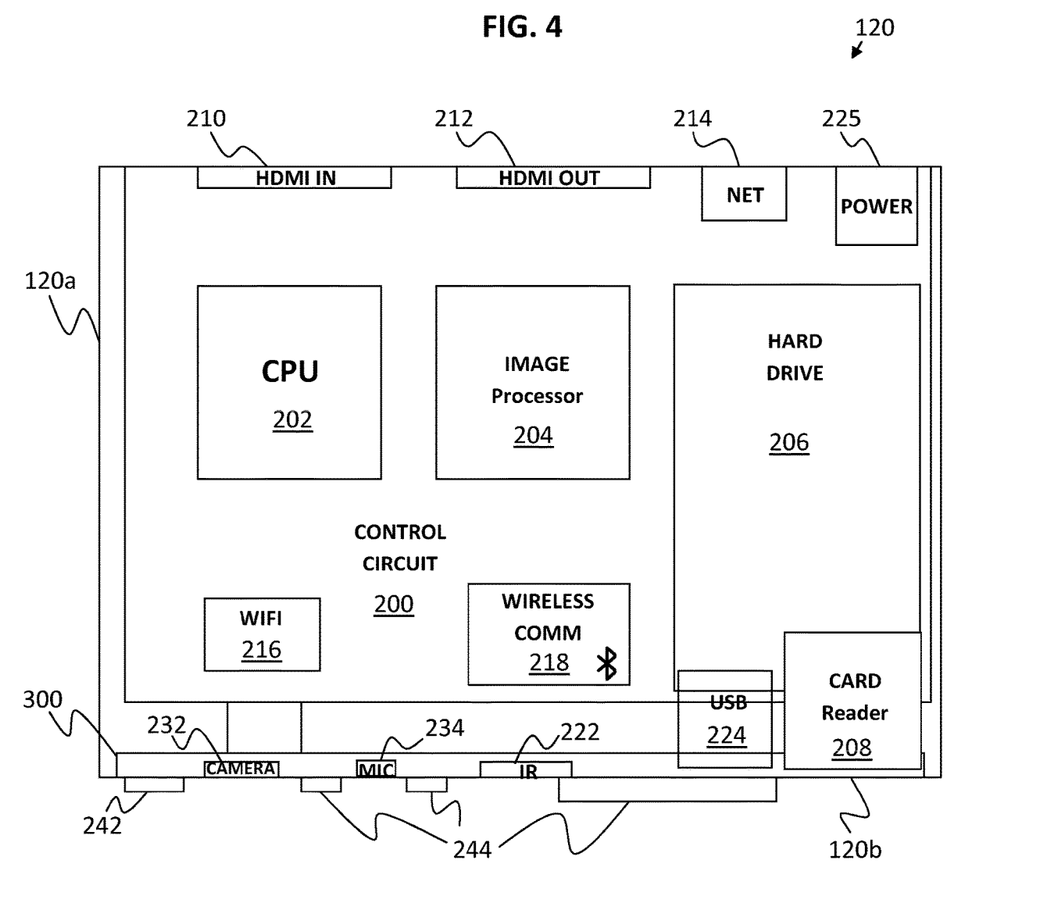
FIG. 4 is a schematic illustration of an entertainment device according to principles of the present inventive concepts.

Referring additionally to FIG. 4, the entertainment device 120 may include, for instance, one or more of the following components arranged in a housing 120a: a control circuit 200, a CPU 202, an audio and/or video input port 210, an image processor 204, a data storage device 206, a wifi communication device 216, a wireless communications device (i.e., including a Bluetooth communications link) 218, a network (i.e., Ethernet) connection port 214, an IR receiver 222, a USB input/output port 224, an audio and/or video output port 212, and a power supply connection 225.

The control circuit 200 preferably interconnects the electronic components and receives and directs signals from the various electronic components to cause the entertainment device 120 to perform the desired operations. A separate front panel board 300 may be provided to connect the electronic inputs and devices (e.g., power button 242, input devices 244, camera 232, microphone 234, IR receiver 222, USB port 224, and card reader 208) on a front panel 120b of the unit 120 to the control panel 200. Alternatively, the control circuit 200 could extend to the front panel 120b of the device 120 and have the electronic components arranged on the front panel 120b connected directly thereto.

A connected or separate controller such as a wireless remote 160, a wireless controller or Bluetooth controller 140, or a USB controller (not shown) may also be provided to connect with and control the entertainment device 120. Alternatively or additionally, a handheld electronic device 150 such as a cell phone, tablet, or other Bluetooth or wireless communication device may be used to control the entertainment device 120. A camera 232, microphone 234, and/or other audio and/or video input device could be included as part of the entertainment device 120, or they could be provided externally and connected to the entertainment device 120 either through the USB port 224, the Bluetooth communications link 218, wifi connection 216, or otherwise.

The entertainment device 120 may further include a power button 242 and one or more additional input devices 244, such as control buttons, dials, touch pads, or other input devices for further controlling the entertainment device 120. These input devices 244 could provide partial or complete functionality to the device 120 even without a separate controller.

Figure 5:
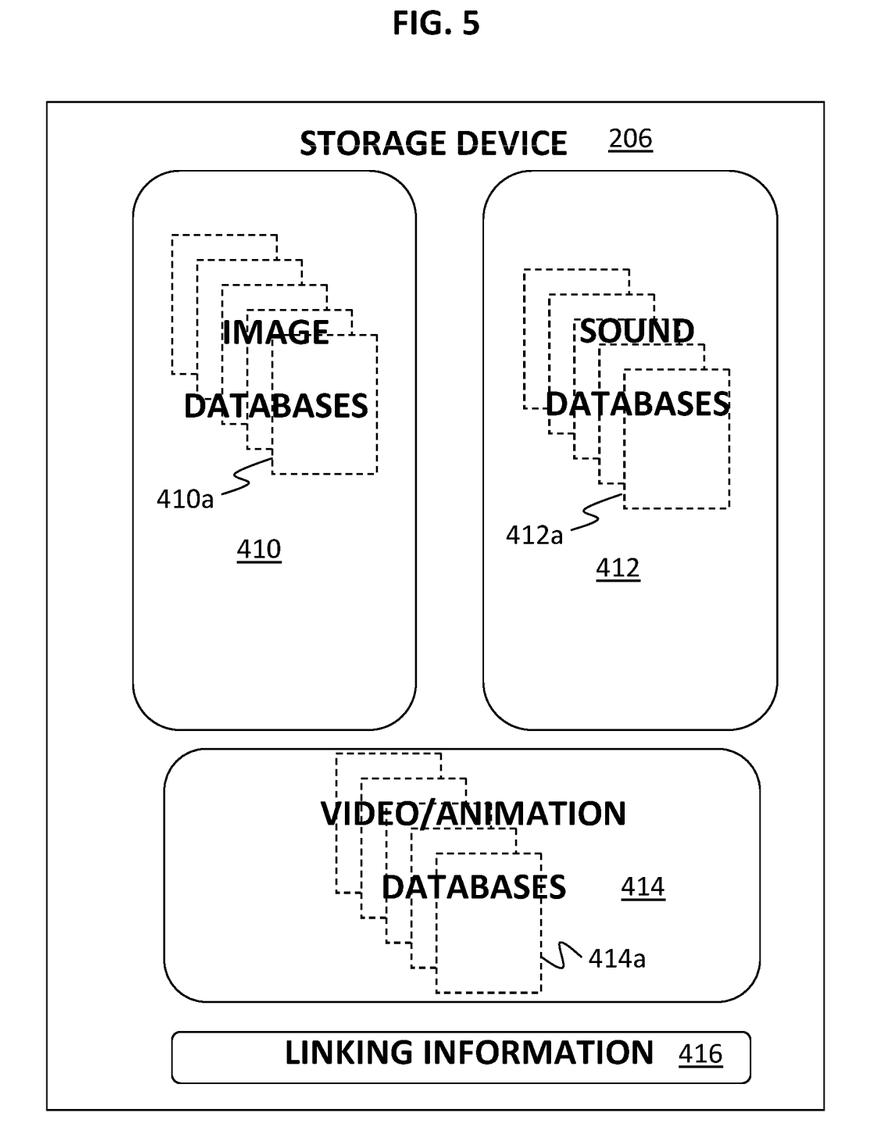
FIG. 5 is a schematic representation of a storage device of an entertainment device according to still further principles of the present inventive concepts.

Referring additionally to FIG. 5, the storage device may include a hard drive 206, memory card reader 208, and/or other data storage device capable of storing one or more image, video/animation, and/or audio databases 410, 412, 414, respectively, to be accessed by the entertainment device 120. An image database 410a may, for example, be a database comprising clip art images, a video/animation database 414a may be a database including animations, or short video clips. An audio database 412a could be, for instance, a database including various sound effects. The databases and/or collections 410, 412, 414 could be made accessible by the user of the entertainment device 120 to permit the user to select images, sounds, or video segments from the databases using the external controller 140, 150, 160 or integral input devices 244. Alternatively, images, videos, and audio segments could all be contained together in a single database or databases.

In some embodiments, images, animations, or video segments in the image or video/animation databases 410, 414, respectively, could be linked to specific sounds in the sound database(s) 412 such that selection of those images automatically selects the associated sound. For instance, images, videos, or animations of gas clouds could be associated with the sound of passing gas, or explosion video effects could be associated with a corresponding explosion sound, such that selecting those images, animations, or video effects automatically includes the associated sound in the audio output. Linking information 416 could be included in the storage device to provide the desired links between images and sounds. These links could be supplied to the user, and/or the user may be permitted to create their own linking information.

Referring now to FIGS. 1 through 5, a method of operating the entertainment device 120 in the entertainment system 100 will now be explained. The entertainment device 120 may be connected between an audio/video input signal 112 and a television 130 (such as between a cable box 110 and a television 130). Alternatively, the entertainment device 120 may be integrated into an audio/video supply device 110 (such as a cable box, a dvd player, a dvr, video streaming device, etc.).

The entertainment device 120 preferably passes the input audio/video signal 112 from the supply device 110 or other audio/video source through to the television 130 but permits the user to overlay selected images, animations, or video clips on top of the video images being passed through to create a humorous or entertaining video output 122a that can be supplied to and displayed on the television 130. Sounds or sound effects can also (or alternatively) be incorporated into or replace the audio in the signal 122a supplied to the television 130 to enhance the entertainment experience.

For example, a database 410a could comprise a set of images containing humorous facial features, hats or other clothing accessories, or any other desired images. For instance, facial features such as noses, mustaches, horns, antlers, ears, mouths, etc., could be provided; clothing such as hats, ties, scarves, jewelry, etc., could be provided; or ornamentations such as stars, circles, diamonds, or other shapes, could be provided. Of course, any desired images may be provided in an appropriate database or set of databases.

The user could use a controller 140, 150, or 160 to select one or more images from the database 410a to display on selected locations of the screen 132 and/or over selected portions of the underlying image 134. Resizing, rotation, flipping, cropping, and other tools could be provided to permit a user to adjust characteristics of the selected image 136a to better match the underlying video image 134. Alternatively, or additionally, software (such as image recognition software) could be included in the entertainment device 120 to permit the user to attach the selected image 136a to a certain feature in the underlying video 134 so that the attached image will move and/or rotate with the selected feature in the underlying video image. Automatic resizing and other features could also be provided.

Alternatively or additionally, the database(s) 410, 412, 414 could comprise a set of images, animations, and/or video segments or effects and associated or linked sound effects. For instance, an image, animation, or video segment of a cloud of gas could be included and could further be associated with (or linked to) the sound of passing gas. An image, animation, or video segment of an explosion could be included and could further be associated with (or linked to) a corresponding sound of an explosion. A separate sound effect database 412 could also be provided permitting users to select sounds to overlay the audio track with or without an associated image, animation, or video segment. Users could also be permitted to create and store their own links between video and audio content in the database(s). When an image, animation, or video segment is selected having a linked sound, the sound can be automatically outputted in the signal 122a provided to the television so that the audio output is played as the image is displayed. The output signal 122a could be provided to the television 130 directly, or it may be delivered through another pass-through device such as a receiver (not shown).

The images can be set to display for a predetermined length of time, and/or the user can be permitted to select and/or adjust his own preferences for how long to display an image. Animations, video segments, and audio effects can also be configured to generally play for their default length of time, but could also be permitted to repeat, slow-motion play, or speed up to fit a desired user-selected time period.

Of course, numberless possibilities exist for the selection of sounds, images, animations, and video segments to be included in the databases 410, 412, 414. Certain databases may be preinstalled in the storage device 206, and other databases may be later accessed and installed through the USB port 224, the Bluetooth communications link 218, the wifi connection 216, and/or the network port 214. Various libraries of databases can be made available for access online through the device 120 itself, through a connectable Bluetooth device 150, or through a separate device that can retrieve and store the database on a removable or other media that can permit later transfer to the entertainment device (such as through the USB port 224 or card reader 208).

These libraries may include, for instance, free libraries, paid libraries, and community libraries. More specifically, certain databases may be made available for free or for purchase online or may be preinstalled and made unlockable based on certain conditions, such as purchasing or otherwise enrolling in a subscription service. In addition, users could be provided with the ability to create their own databases of sounds, images or video segments using an audio and/or video input device, controller, and/or other sound or image creation devices. A forum or community could be formed to make user-created databases accessible by other users.

In one embodiment, the entertainment device 120 in connection with a video input device 232 could be usable to overlay live video or pre-recorded video segments over the underlying video signal in real-time. A green-screening feature could be implemented to select which areas of the selected video segment to eliminate from the video overlay. The green-screening selection capability could be provided in the device itself or through an associated program or application software (i.e., a Bluetooth device app) to permit a user to select a color from the selected video segment to eliminate from the video overlay. Audio from an input device could also be received and used to overlay or entirely replace the audio from the incoming audio/video signal.

A capture feature could further be provided to permit a user to capture images or short video clips of the combined video output signal 122a (with or without audio) for later viewing or sharing. The captured combined output images, video output segments, or audio/video output segments could then be shared, for example, via social media or via the online user community.

In one embodiment, the Bluetooth communications link 218 or wifi communications link 216 permits one or more users to connect to and control the entertainment device 120 using their own cell phones, tablets, or other Bluetooth or wireless electronic devices 150. An app may be provided to be installed on the electronic device 150 to provide it with the desired functionality. While watching a television or other video program 134 supplied to the television 130 from an audio/video source 110 through the entertainment device 120, the one or more users can each use their individual controllers 150 to select and add sounds, images, animations, and/or video segments from the desired databases 410, 412, 414 over the underlying audio and video signals 112 to create humorous audio and/or visual effects in a combined output signal 122a to be enjoyed by themselves, the other users, and anyone else viewing the television 130. The output signal 122a can, for instance, be provided in real-time or with minimal delay. The users could also be provided with the ability to capture images or short audio/video segments from the audio/video output signal 122a to view later or share.

As explained above, in an alternative embodiment, one or more users may use the green-screening feature in connection with a video input device to add video of themselves or other desired video images over the underlying video signal. For instance, a user may create a video segment and select a color to remove from the image overlay. The entertainment device could then overlay the video segment on top of the underlying image with areas of the created video segment of the selected color being removed from the image overlay.

Various further aspects, embodiments, and configurations of this invention are possible without departing from the principles disclosed herein. This invention is therefore not limited to any of the particular aspects, embodiments, or configurations described herein. Having described and illustrated principles of the present invention in various illustrative embodiments thereof, it should be apparent that the invention can be modified in arrangement and detail without departing from such principles.

What is claimed is:

1. A set-top entertainment device configured to be arranged between a television video source and a television display comprising:

an input port arranged to connect the entertainment device to the television video source to receive a television input signal, said television input signal comprising a video image for displaying on the television display;

a storage device storing an overlay image database comprising a plurality of user-selectable overlay images, wherein the overlay images are still images or video images;

a communications module for simultaneously communicating directly with multiple controllers, wherein each controller is usable by a different user to each independently and simultaneously select a desired overlay image from the overlay image database and to further each independently and simultaneously select a desired location for positioning the selected overlay image on the television display to appear over the video image from the television input signal substantially in real-time in a combined output signal, such that multiple users can simultaneously directly access and control a single set-top entertainment device to select and position multiple desired overlay images substantially in real-time;

a processor configured to combine the video image from the television input signal with the selected overlay images into the combined output signal substantially in real-time with the input signal being received into the input port; and an output port arranged to provide the combined output signal to the television display, wherein the entertainment device is programmed to output the combined output signal substantially in real-time with the television input signal being received into the input port.

2. The entertainment device of claim 1, wherein each controller is a wireless controller configured to communicate with the entertainment device to directly access the overlay image database on the single set-top entertainment device to individually select the desired overlay image directly from the overlay image database of the single set-top entertainment device along with a screen position for placement of the selected overlay image on the television display.

3. The entertainment device of claim 2, wherein each separate controller is a Bluetooth controller configured to simultaneously access and control the entertainment device to individually select one or more overlay images from the overlay image database along with a screen position for placement of the selected overlay images on the television display independently of any of the other Bluetooth controllers and wherein the combined output signal is not provided to any of the controllers.

4. The entertainment device of claim 2, wherein at least one controller is a handheld phone, and wherein multiple users can each use a separate handheld phone to directly control the single entertainment device at the same time.

5. The entertainment device of claim 4, wherein each of the handheld phones communicating with the entertainment device comprises an application that permits it to communicate with and control the entertainment device.

6. The entertainment device of claim 1, further comprising a separate sound database that comprises a plurality of sounds that are selectable separately from any selection of images from the overlay image database, and wherein each user is independently able to select one or more sounds from the separate sound database for substantially real-time inclusion in the combined output signal.

7. The entertainment device of claim 6, wherein the separate sound database is stored in the storage device separately from the overlay image database.

8. The entertainment device of claim 6, further comprising linking information stored in the storage device that links one or more overlay images in the overlay image database with one or more sounds in the separate sound database, wherein user selection of an overlay image comprising a linked sound automatically selects the linked sound from the separate sound database to include in the combined output signal substantially in real-time with the input signal being received into the input port, but wherein selection of a linked sound from the separate sound database does not automatically select the overlay image comprising the linked sound.

9. The entertainment device of claim 1, wherein only the single set-top entertainment device processes the combined output signal and wherein the controllers do not receive or process the video image from the television input signal.

10. The entertainment device of claim 1, wherein the overlay image database is located only on the storage device of the single set-top entertainment device and not on any of the controllers.

11. The entertainment device of claim 1, wherein each user is further able to use one of the controllers to select one or more sounds from a separate sound database separately from the selection of the desired overlay image to include in the combined output signal substantially in real-time with the input signal being received in the input port.

12. The entertainment device of claim 11, further comprising linking information that is supplied with the overlay image database, said linking information stored in the storage device and linking one or more sounds in the sound database to one or more of the overlay images in the separate overlay image database, such that selecting an overlay image from the overlay image database that is linked to a sound in the separate sound database will cause the sound associated with the overlay image to be included in the combined output signal along with the overlay image, but wherein selection of a linked sound from the separate sound database does not automatically select the overlay image comprising the linked sound.

13. A method for providing entertainment content to a display, said method comprising:
receiving an input signal comprising a video signal from a video source into a set-top entertainment device;
permitting multiple users to simultaneously select overlay images directly from an overlay image database stored in the set-top entertainment device to overlay on top of a video image from the input signal and to select screen locations for the overlay images from the overlay image database to be displayed on a display over the video image from the video source substantially in real-time with the input signal being received into the entertainment device;
combining any selected overlay images in the selected locations with the input signal into a combined output signal; and
outputting the combined output signal from the set-top entertainment device to the display substantially in real-time with receiving the input signal from the video source.

14. The method according to claim 13, wherein the video source is an audio/video source and further comprising permitting the multiple users to separately select one or more sounds from a sound database, wherein the sound database is separate from the overlay image database and is stored in the set-top entertainment device, to include in the combined output signal substantially in real-time with the input signal being received into the entertainment device.

15. The method according to claim 14, further comprising providing linking information for linking one or more of the user-selectable sounds in the separate sound database to one or more overlay images in the overlay image database, wherein the selection of an overlay image from the overlay image database having a linked sound automatically selects the linked sound from the separate sound database to include in the combined output signal along with the overlay image, but wherein selection of the linked sound does not automatically select the overlay image.

16. The method according to claim 13, wherein the multiple users can use multiple controllers to communicate with a single set-top entertainment device to simultaneously select overlay images directly from the overlay image database located only on the single set-top entertainment device.

17. An entertainment device comprising:
an input port configured to receive a video source signal from a video source and an output port configured to provide a video entertainment signal to a display connected to the entertainment device;
a communications module configured to simultaneously communicate directly with a plurality of controllers, such that the controllers are able to simultaneously control the entertainment device;
a storage device containing an overlay image database, and
wherein the plurality of controllers are usable by multiple users to each separately and independently select one or more overlay images from the overlay image database and to separately and independently select a location for the one or more overlay images selected by that controller to be displayed on the display substantially in real-time with the video source signal being received into the entertainment device.

18. The entertainment device of claim 17, wherein the video source signal is an audio/video source signal and wherein the entertainment device further comprises a sound database separate from the overlay image database, wherein the controllers are each further configured to be able to separately select a sound from the sound database, said selected sound to be included in an audio/video entertainment signal provided to the display substantially in real-time with the audio/video source signal being received into the entertainment device.

19. The entertainment device of claim 18, wherein the storage device further includes linking information supplied with the overlay image database or the separate sound database that links one or more images in the overlay image database with one or more sounds in the separate sound database, wherein selection of an overlay image from the overlay image database having a linked sound automatically selects the linked sound from the separate sound database to be included in the audio/video entertainment signal along with the selected overlay image, but wherein selection of a linked sound does not automatically select an overlay image.

20. The entertainment device of claim 17, wherein the plurality of controllers are usable by multiple users to communicate with a single entertainment device to simultaneously select overlay images directly from the overlay image database located only on the storage device of the single entertainment device and not on any of the controllers.

* * * * *